United States Patent [19]

Perret et al.

[11] Patent Number: 4,584,056

[45] Date of Patent: Apr. 22, 1986

[54] METHOD OF MANUFACTURING A DEVICE WITH MICRO-SHUTTERS AND APPLICATION OF SUCH A METHOD TO OBTAIN A LIGHT MODULATING DEVICE

[75] Inventors: André Perret, Les Geneveys-sur-Coffrane; Raymond Vuilleumier, Fontainemelon, both of Switzerland

[73] Assignee: Centre Electronique Horloger S.A., Switzerland

[21] Appl. No.: 670,929

[22] Filed: Nov. 13, 1984

[30] Foreign Application Priority Data

Nov. 18, 1983 [CH] Switzerland .......................... 199/83

[51] Int. Cl.⁴ ........................ B44C 1/22; C03C 15/00; C03C 25/06; C23F 1/02

[52] U.S. Cl. .................................... 156/630; 156/633; 156/634; 156/643; 156/646; 156/652; 156/655; 156/656; 156/659.1; 340/763; 430/320

[58] Field of Search ............... 156/630, 633, 634, 643, 156/646, 650, 651, 652, 655, 656, 659.1; 430/320, 323, 324, 321; 340/763, 764, 815.27

[56] References Cited

U.S. PATENT DOCUMENTS

| | | | |
|---|---|---|---|
| 3,574,012 | 4/1971 | Penberg | 156/644 X |
| 4,058,432 | 11/1977 | Schuster-Woldan et al. | 156/664 X |
| 4,170,512 | 10/1979 | Flanders et al. | 156/633 X |
| 4,392,914 | 7/1983 | Takenaka et al. | 156/633 |

*Primary Examiner*—William A. Powell
*Attorney, Agent, or Firm*—Parkhurst & Oliff

[57] ABSTRACT

A method for manufacturing a device with micro-shutters, e.g., a light modulating device, includes the following steps: producing a first grid presenting cells; providing a plane support by depositing a layer of organic material on the grid filling the cells; producing a second grid on the layer of organic material; depositing a fine metallic layer on the second grid; cutting shutters and shutter attachments in the fine metallic layer; and removing the organic material layer in the cells to free the shutters.

28 Claims, 12 Drawing Figures

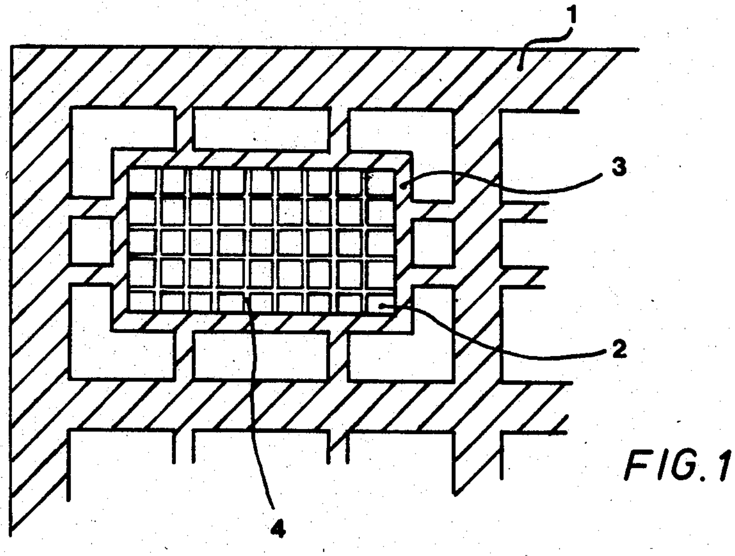
FIG. 1
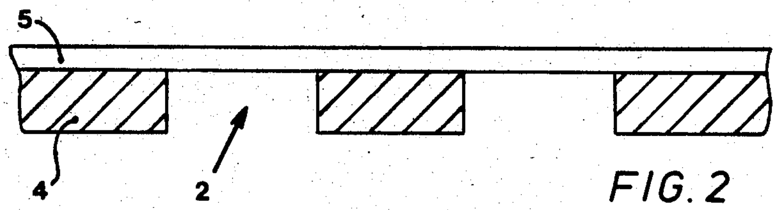
FIG. 2
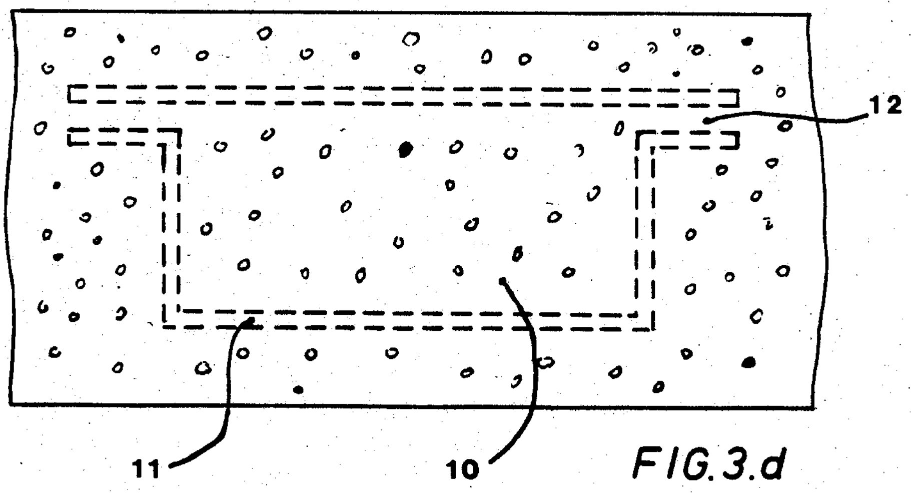
FIG. 3.d

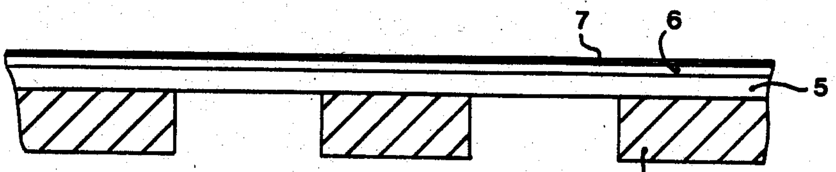
FIG. 3.a
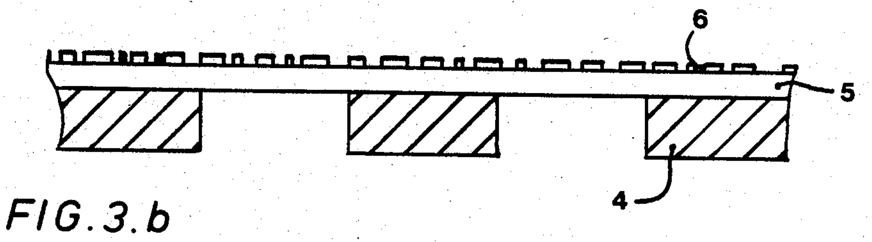
FIG. 3.b
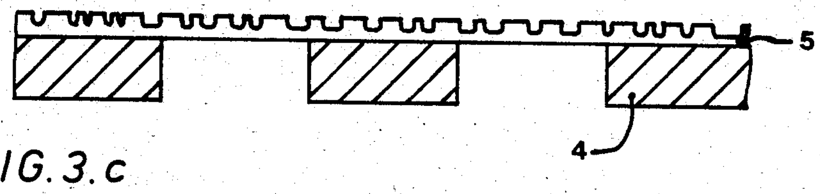
FIG. 3.c
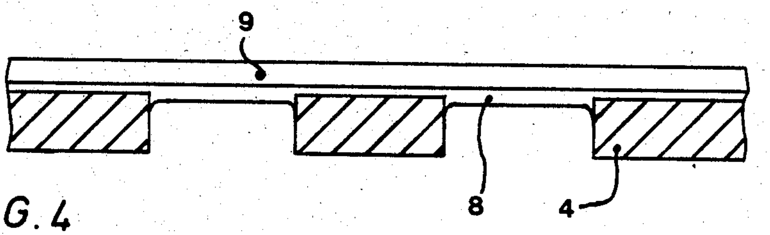
FIG. 4

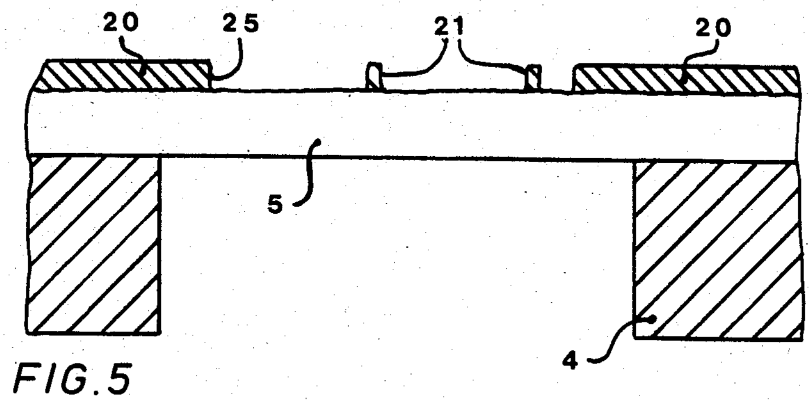
FIG. 5
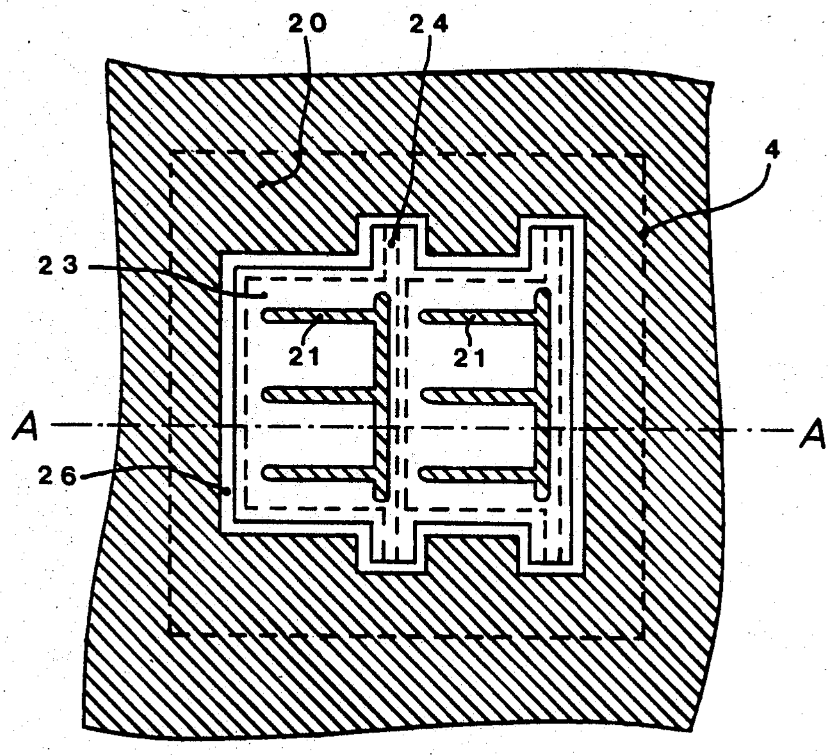
FIG. 6.b

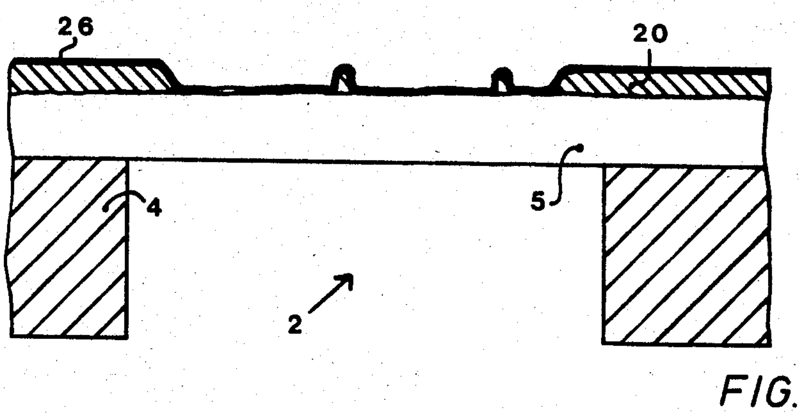
FIG. 6.a
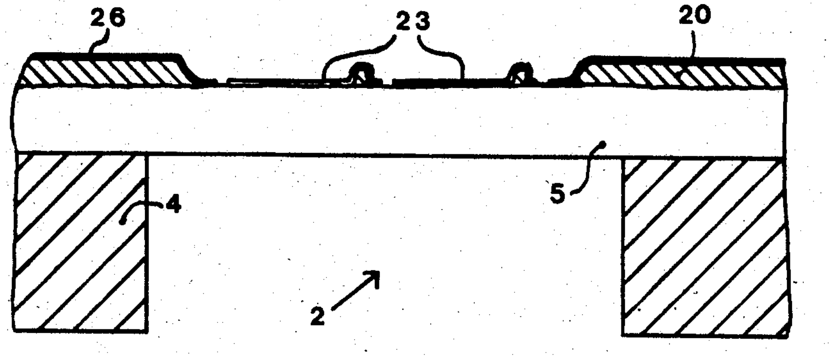
FIG. 6.c
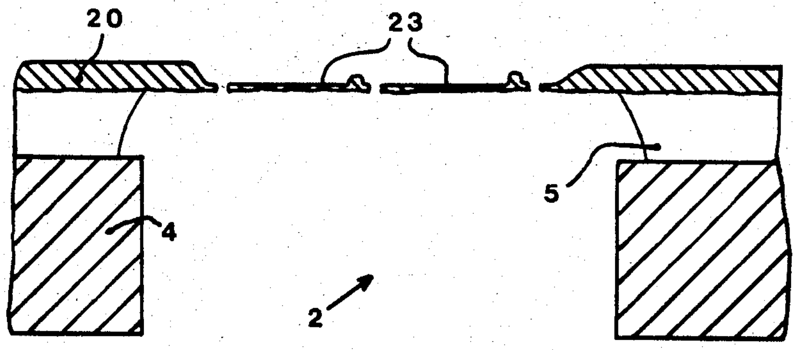
FIG. 7

METHOD OF MANUFACTURING A DEVICE WITH MICRO-SHUTTERS AND APPLICATION OF SUCH A METHOD TO OBTAIN A LIGHT MODULATING DEVICE

BACKGROUND OF THE INVENTION

The present invention relates to a method of manufacturing a device with micro-shutters and concerns more particularly a method of manufacturing a device including a plane support to which are fixed, by elastic attachments, miniature shutters capable of being controlled for rotation, as well as the application of such a method to obtain a light modulating device.

There has already been described in U.S. Pat. No. 4,383,255, entitled "Miniature display device", a display device with micro-shutters of the electrostatic type produced on a silicon wafer by means of techniques similar to those used for manufacturing integrated circuits. Although the use of a silicon support offers certain advantages among which is that of allowing the application of known and well practiced working techniques, it entails, however, certain constraints or limitations which are due to the material itself. Thus, the crystallographic orientations of monocrystalline silicon impose well defined planes of chemical attack; this limits, among other things, the possible geometries. For further information, reference may be made to the article by Kenneth E. Bean entitled "Anisotropic etching of silicon", published in the journal *IEEE Transactions on Electronic Devices,* Vol. ED-25, No. 10, of October, 1978. Furthermore, the silicon wafers actually available on the market have a maximum given diameter; this proportionately limits the size of the display device that can be produced. On the other hand, when the thickness of the wafer must be reduced to values of about 200 μm, the mechanical fragility thereof is such that very great precautions in handling are required.

An object of the invention is therefore to provide a method of manufacturing a device with micro-shutters involving materials which do not present the above-mentioned disadvantages.

Another object of the invention is to provide a method of manufacturing a device with micro-shutters based on the use of relatively cheap materials and involving photolithographic operations similar to those used in the manufacture of integrated circuits.

Another object of the invention is the application of the method referred to hereinbefore to obtain a light modulating device.

Another object of the invention is the application of the method referred to hereinbefore to obtain a display device.

SUMMARY OF THE INVENTION

To eliminate the aforementioned problems connected with the use of a substrate of silicon, it is intended that a rigid substrate which is easily worked and prepared for the application envisaged, that is to say with suitably arranged cavities, be used. The applicant has found that organic materials or polymers are suited to advantageous application of photolithographic techniques, thereby allowing very small geometries to be produced with great precision.

According to the present invention a first rigid and thin grid is prepared having at least one cell for a shutter. A layer of organic material is deposited on the first grid, blocking up the cells thereof, to produce a plane support. If desired, this organic material layer can be treated to be light diffusing. After treatment, if any, of the organic layer, a second grid is prepared on top thereof. Thin ribs also can be added to the portions which will become the shutters. A fine metallic layer then is applied over the second grid and any ribs. The shutters and their attachments are cut in the metallic layer, and the organic material layer is etched away from beneath the shutters.

BRIEF DESCRIPTION OF THE DRAWINGS

Other objects, features and advantages of the present invention will appear more clearly in the course of the following description of the different steps of the method, the said description being given by way of non-limiting example only and with reference to the attached drawings in which like numbers refer to like elements:

FIG. 1 shows a partial view of an embodiment of a grid serving as a support for a display device with shutters.

FIG. 2 shows, in section, the grid of FIG. 1 covered with a plastic film.

FIGS. 3.*a* to 3.*c* show different steps in the production of a diffusing surface.

FIG. 3.*d* shows the distribution of holes in the diffusing surface relative to the shutter to be produced.

FIG. 4 shows an embodiment of the method allowing a plane support to be obtained from the grid of FIG. 1.

FIG. 5 shows the production of a second grid for rigidification.

FIGS. 6.*a* and 6.*c* show different steps for obtaining shutters.

FIG. 6.*b* shows, seen from above, the rigidifying grid and a set of two shutters.

FIG. 7 shows a partial view, in section, of a device with micro-shuttters after etching of the plastic film.

DETAILED DESCRIPTION OF THE INVENTION

The method of the invention will, by way of example, be described in the context of its application to the production of a display device with micro-shutters, such as described in the above-mentioned U.S. patent.

One of the primary elements of the method of the invention is use of the support or bearer grid, an example of which is represented in FIG. 1. The drawing of FIG. 1 shows relatively wide parts 1, intended to ensure sufficient rigidity of the grid and to allow easy handling, a body 3 which bounds the true useful region within which a fine lattice 4 is produced and which in turn defines cells 2. Clearly, several useful regions can be produced on a single grid, just as the configuration of this or these useful regions can be adapted to the application envisaged. The basic grid is produced in aluminum using known photolithographic methods or by making use of more rigid materials, such as metallic compounds, known under the trade marks Dilver, Kovar, Invar, or also ceramic materials. The essential properties of this grid are its mechanical rigidity at small thicknesses and its compatibility with the later technological steps. The dimensions typically used in the context of the application being considered are:

thickness of the grid: 200 μm
sides of the cells: 500 μm
space between cells: 200 to 300 μm.

These dimensions are given only as illustration. Hence, if more rigid materials than aluminum are used, the thickness of the grid can be reduced to about 100 μm without compromising its supporting function. In other respects the dimensions of the cells can be appreciably increased as will be seen further in relation to the description of the rigidifying grid.

The second step of the method comprises producing a plane surface on the bearer grid. FIG. 2 shows the grid 4 coated with a film of polyimide such as that known under the trade name Kapton. This film 5, with a typical thickness of 25 μm, is glued to the grid 4 with an adhesive having the property of not causing any distortion of the film 5. The adhesive marketed by the company Ciba-Geigy under the name of "AZ 15 Araldite" has this property. Materials other than Kapton can also be used. Preferably, organic materials (for example, epoxy resins) will be chosen which are compatible with the material of the grid and the manufacturing steps and which have a good performance with temperature and humidity. The bearer grid thus coated comprises a plane support for the later operations.

FIGS. 3.*a* to 3.*d* show in detail the steps for producing a diffusing surface. These steps are necessary if a display device is to be produced in which specular reflection does not detract from the aesthetic appeal. FIG. 3.*a* shows how the film 5 of Kapton is covered with a photosensitive layer 6, which is exposed through a mask 7. This mask has a random distribution of holes which, after the conventional operations of exposure and development, are reproduced on the photosensitive layer 6, as shown in FIG. 3.*b*. The photosensitive layer thus prepared is then etched in a plasma, which results in the reproduction on the Kapton film 5 of the surface conditions initially created on the photosensitive layer. FIG. 3.*c* shows how the outer surface of the Kapton film has been modified. FIG. 3.*d* represents a partial view from above of the Kapton film on which a shutter 10 will be produced. At the end of the method, the shutter 10 will be held to the support by elastic attachments 12 which must allow rotation of the shutter. Hence, the importance of the mechanical properties of these attachments will be understood. For this reason the mask 7 must protect the regions of the attachments 12; it must likewise protect a region 11 which surrounds each shutter and separates it from the support.

FIG. 4 shows a variant according to which the cells of the grid 4 are blocked up with a polymerisable material, preferably organic, which can be removed by plasma etching. For example, this material can be an epoxy adhesive 8, which is deposited on a plane element 9 by using a silk-screen printing apparatus. The grid 4 is then pressed against the sized surface of the element 9 so that the adhesive 8 is pushed into the cells of the grid. The plane element 9 can be of Kapton. If a diffusing surface is to be produced, the face of the element 9 in contact with the epoxy adhesive 8 can have been previously treated as described above so as to present surface irregularities which will be reproduced on the outer face of the adhesive 8. Polymerization of the adhesive is then carried out, then the Kapton is etched selectively and a grid is obtained presenting on one side a plane surface, possibly structured, the cells of which are partly filled with polymerized adhesive.

The steps of the method previously described have the object of obtaining a plane support, possibly presenting a diffusing surface, from a structured element or grid. The following steps of the method have the object of producing micro-shutters on the said plane support and finally their freeing. These steps will now be described with reference to FIGS. 5 to 7 which show the production of a display element with two shutters.

In a first step, a rigidifying grid is produced. There then proceeds the depositing of a layer of aluminum with a thickness of the order of 1 μm over the whole of the surface of the film 5. This layer is then selectively etched at the locations of the shutters. Thus in the embodiment envisaged, the layer of aluminum will be removed in the regions which will be occupied by shutters with the exception of ribs 21 disposed on the shutters, as indicated in FIG. 6.*b*. FIG. 5 shows, in section, the layer 20 of aluminum and the ribs 21. This layer 20 of aluminum has edge walls 25 which are fairly stiff and which can be smoothed off by plunging the assembly into an etching dip bath for aluminum for a relatively short time. The operations of depositing aluminum and selective etching are conventional operations of integrated circuit technology and their description can be found in the book *Handbook of Thin Film Technology*, by Maissel and Glang, published by Editions McGraw-Hill, Inc.

In the embodiment envisaged, the ribs 21 have the same thickness as the layer 20 of aluminum surrounding the shutters. However, it may be envisaged that the thickness of the ribs 21 and the layer 20 may be different in the case in which the layer 20, for example, can be produced by two successive depositions, the last deposition having the thickness desired for the ribs. In other respects it will be understood that this rigidifying grid 20 ensures a rigidity such that it allows the use of a bearer grid 4 presenting cells 2 with large dimensions to be envisaged. At the limit and for small display devices, the bearer grid 4 can present only a single cell 2, the rigidity of the assembly being then ensured by the rigidifying grid 20.

FIG. 6.*a* shows how the rigidifying grid 20 is then covered, by evaporation, with a fine layer 26 of aluminum with a thickness of 50 nm. The shutters 23 (FIGS. 6.*b* and 6.*c*) and their attachments 24 (FIG. 6.*b*) are then cut in the layer 26 by means of standard processes. FIG. 6.*c* shows the shutters 23 resulting from the cutting operation and FIG. 6.*b* shows, viewed from above, the respective positioning of the first grid 4, the second grid 20, the thin layer 26, the shutters 23 and their attachments 24. FIG. 6.*b* shows also the arrangement of the ribs 21 on the shutters 23. These ribs have the result of rigidifying the surface of the shutters but without substantially increasing their mass or their thickness. It should moreover be noted that the structuring of the surface intended to render it diffusing, described with reference to FIGS. 3.*a* to 3.*d*, also has the result of rigidifying the shutters and can therefore be envisaged on this ground even if the aesthetic aspect of the device is not of the first importance.

The last phase of the method consists in freeing the shutters from their support, that is to say, removing the film 5 under the shutters 23 inside the cells of the grid 4. The film 5 of Kapton is etched with a gas phase plasma (oxygen plasma) until there is complete freeing of the shutters which are then attached to the support 20 only by their attachments 24 (FIG. 6.*b*). FIG. 7 shows the freed shutters 23 and how the film 5 has been removed in the cells defined by the grid 4.

A preferred application of the method described hereinbefore is for the production of light modulating devices such as those described in the previously cited patent. In this case, the grid 4 is fixed, by gluing, on a base carrying electrodes in such a manner that these electrodes may be arranged facing each shutter, if each shutter is individually addressable, or each group of shutters, if several shutters are addressable simultaneously. The base can also include an electronic control circuit. If the light modulating device is intended to operate in transmission, the base, provided with electrodes, must necessarily be transparent. In contrast, if it is intended to operate in reflection, the base must present a face of light absorbing material at the side with the shutters.

The light modulating device is then closed by means of a transparent plate held at a suitable distance from the shutters by spacers. The transparent plate as well as the base can be of glass or of any other similar material.

According to a variant of embodiment, the electrodes allowing addressing of the shutters are disposed on the transparent plate.

Although the present invention has been described in the context of particular examples of application, it is to be understood that it is not limited to the said examples and that modifications and variants thereof would be readily apparent to one of ordinary skill in the art without exceeding the scope of the invention as defined by the claims below.

What is claimed is:

1. A method of manufacturing a micro-shutter device comprising:

producing a first rigid and thin grid presenting at least one cell;

depositing, on said first grid, a layer of organic material blocking up said at least one cell so as to produce a plane support;

producing, on said layer of organic material, a second, rigidifying grid having a thickness substantially less than that of said first grid;

depositing, on said second grid and on any parts of said layer of organic material not covered by said second grid, a fine metallic layer with a thickness substantially less than that of said second grid;

cutting, in said fine metallic layer, at least one shutter and shutter attachments interconnecting said at least one shutter with said second grid; and etching said layer of organic material from said at least one cell of said first grid so as to free said at least one shutter to be rotatable about said shutter attachments.

2. A method according to claim 1, wherein said second grid surrounds locations corresponding to active regions of said at least one shutter.

3. A method according to claim 1, wherein a surface of said layer of organic material is treated such that said at least one shutter and said second grid present a diffusing surface.

4. A method according to claim 1, wherein said surface of said layer of organic material is treated except at locations corresponding to said shutter attachments and regions surrounding said at least one shutter to present a diffusing surface.

5. A method according to claim 3, wherein said surface of the said layer of organic material is treated by photolithographic methods.

6. A method according to claim 1, further comprising the step, prior to depositing said fine metallic layer, of producing ribs on said layer of organic material at locations corresponding to said at least one shutter, said ribs serving to rigidify said at least one shutter.

7. A method according to claim 6, wherein said ribs are produced of the same material as said second grid.

8. A method according to claim 1, wherein said second grid and said fine metallic layer are of the same material.

9. A method according to claim 1, wherein said layer of organic material comprises a plastic film glued to said first grid.

10. A method according to claim 9, wherein said plastic film comprises a polyimide.

11. A method according to claim 1, wherein said layer of organic material comprises a polymerizable material which is pressed onto said first grid and then polymerized to provide a plane support.

12. A method according to claim 1, wherein said layer of organic material comprises a polymerizable material which is pressed onto said first grid and then polymerized to provide a plane, structured support.

13. A method according to claim 1, wherein said first grid is metallic.

14. A method according to claim 13, wherein said first grid is produced by photolithographic methods.

15. A method according to claim 13, wherein said first grid comprises aluminum.

16. A method according to claim 1, wherein said second grid is produced by photolithographic methods.

17. A method according to claim 16, wherein said second grid comprises aluminum.

18. A method according to claim 1, wherein edges of said second grid are rounded by dipping in an etching bath.

19. A method according to claim 1, wherein said fine metallic layer is deposited by evaporation of a metallic material.

20. A method according to claim 19, wherein said fine metallic layer comprises aluminum.

21. A method according to claim 1, wherein said at least one shutter and shutter attachments are cut by photolithographic methods.

22. A method according to claim 1, wherein said layer of organic material is etched by a gas phase plasma.

23. A method according to claim 1, wherein said first grid has a thickness between 100 and 300 $\mu$m.

24. A method according to claim 1, wherein said second grid has a thickness between 0.5 and 2.5 $\mu$m.

25. A method according to claim 1, wherein said fine metallic layer has a thickness of between 20 and 200 nm.

26. A method according to claim 1, wherein said first grid is fixed on a transparent base.

27. A method according to claim 1, wherein said first grid is fixed on a base presenting on a side thereof towards said at least one shutter a surface absorbing at least part of any light received.

28. A method according to claim 27, wherein said base on which said first grid is fixed carries electrodes arranged facing said at least one shutter.

* * * * *